(12) United States Patent
Chen

(10) Patent No.: US 7,065,885 B1
(45) Date of Patent: Jun. 27, 2006

(54) HANDSAW HAVING REPLACEABLE BLADE

(75) Inventor: Yu-Heng Chen, Hua Tan Hsiang (TW)

(73) Assignee: King Jaws Metal Co., Ltd., Hua Tan Hsiang (TW)

( * ) Notice: Subject to any disclaimer, the term of this patent is extended or adjusted under 35 U.S.C. 154(b) by 0 days.

(21) Appl. No.: 10/999,302

(22) Filed: Nov. 29, 2004

(51) Int. Cl.
  *B26B 5/00* (2006.01)
(52) U.S. Cl. .............................. 30/517; 30/331; 30/337
(58) Field of Classification Search ................. 30/161, 30/329, 337, 339, 517, 331
See application file for complete search history.

(56) References Cited

U.S. PATENT DOCUMENTS

| | | | | | |
|---|---|---|---|---|---|
| 156,369 | A | * | 10/1874 | Millspaugh | 30/517 |
| 601,480 | A | * | 3/1898 | Powell | 30/517 |
| 2,137,800 | A | * | 11/1938 | Davey | 30/517 |
| 3,900,950 | A | * | 8/1975 | Collins | 30/337 |
| 4,011,657 | A | * | 3/1977 | Vance | 30/337 |
| 4,169,312 | A | * | 10/1979 | Mar | 30/337 |
| 5,930,902 | A | * | 8/1999 | Hsu | 30/331 |
| 6,058,611 | A | * | 5/2000 | Rickard | 30/349 |
| 2005/0050743 | A1 | * | 3/2005 | Kabasawa | 30/517 |

* cited by examiner

*Primary Examiner*—Hwei-Siu Payer
(74) *Attorney, Agent, or Firm*—Alan D. Kamrath; Nikolai & Mersereau, P.A.

(57) ABSTRACT

A handsaw includes a handle, a blade, and a locking member. Thus, the user only needs to drive the drive lever of the locking member to detach the snapping hook of the locking member from the snapping groove of the handle so as to detach the blade from the handle, so that the blade is detached from the handle easily, rapidly and conveniently, thereby facilitating the user mounting and replacing the blade.

12 Claims, 7 Drawing Sheets

HANDSAW HAVING REPLACEABLE BLADE

BACKGROUND OF THE INVENTION

1. Field of the Invention

The present invention relates to a handsaw, and more particularly to a handsaw having a replaceable blade that can be replaced easily and rapidly.

2. Description of the Related Art

Figure 6:
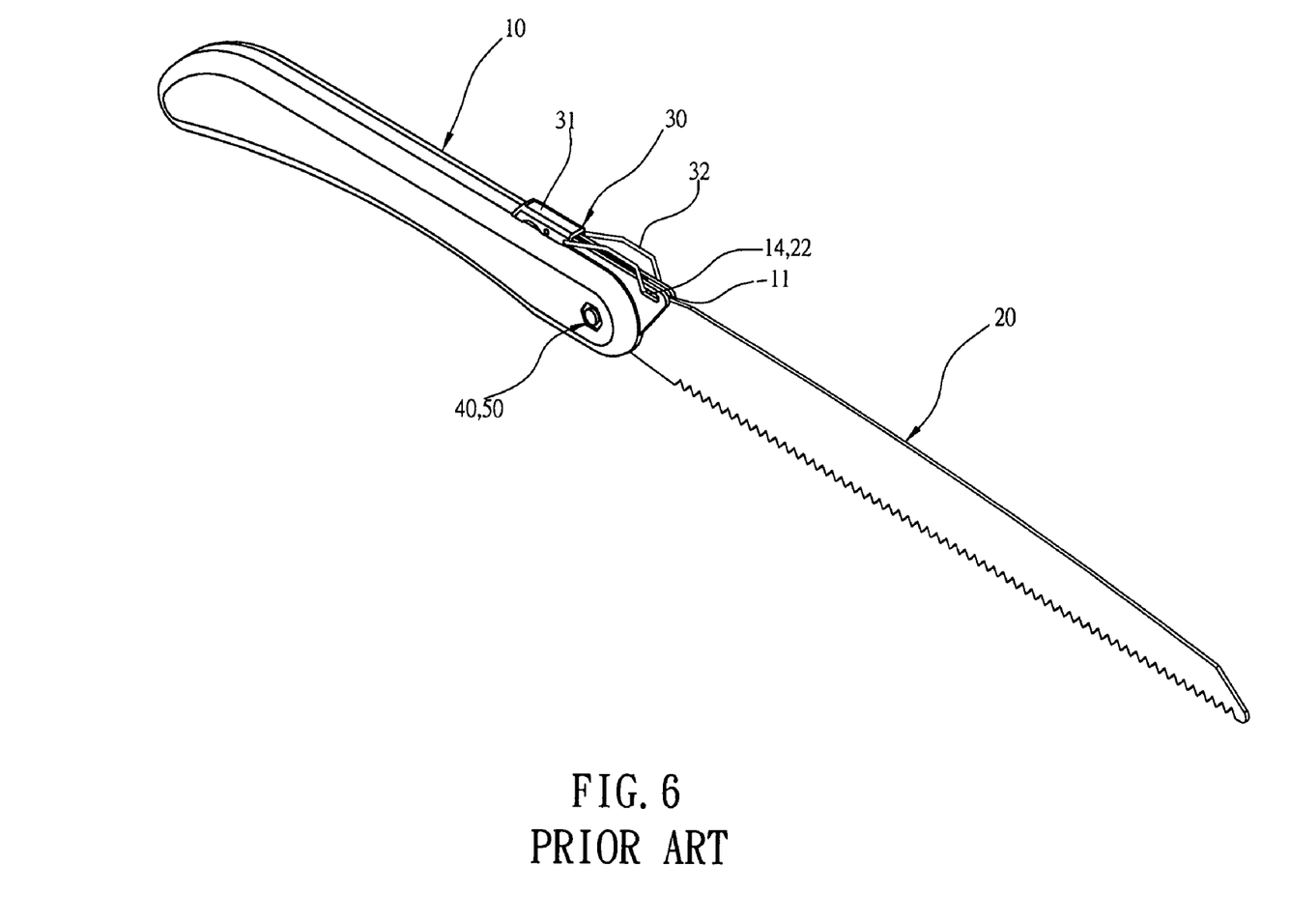
FIG. 6 is a perspective view of a conventional handsaw in accordance with the prior art.
Figure 7:
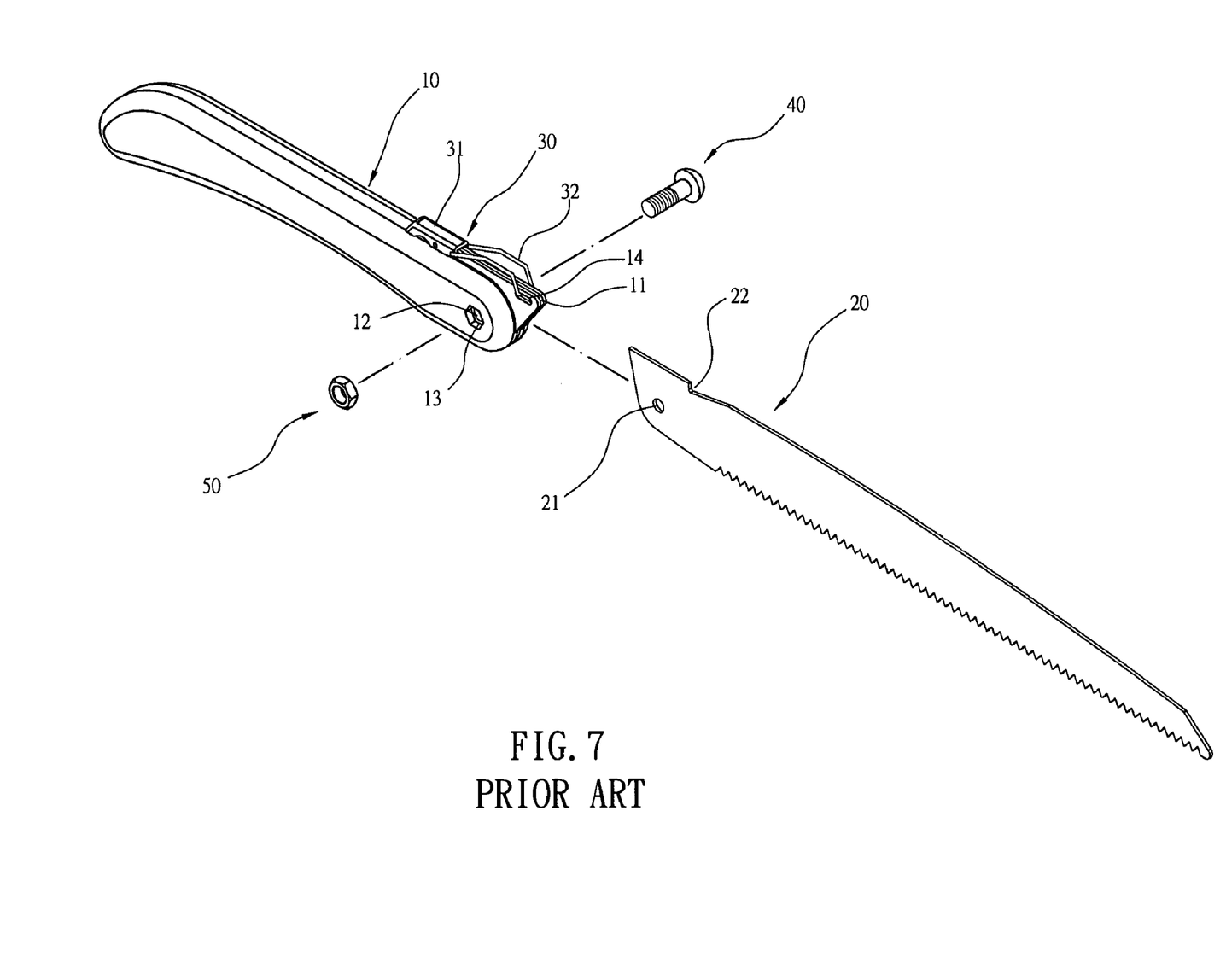
FIG. 7 is an exploded perspective view of the conventional handsaw as shown in FIG. 6.

A conventional handsaw in accordance with the prior art shown in FIGS. 6 and 7 comprises a handle 10 having an end formed with a longitudinal receiving recess 11, a transverse slide slot 14 communicating with the receiving recess 11 and a transverse locking hole 12 communicating with the receiving recess 11 and having a side formed with a hexagonal positioning recess 13, a blade 20 secured on the handle 10 and having an end formed with a through hole 21 aligning with the locking hole 12 of the handle 10 and provided with a locking edge 22 received in the receiving recess 11 of the handle 10 and aligning with the slide slot 14 of the handle 10, a locking screw 40 extended through the locking hole 12 of the handle 10 and the through hole 21 of the blade 20, a locking nut 50 mounted in the positioning recess 13 of the handle 10 and screwed onto the locking screw 40, and a locking member 30 is mounted on the handle 10 and including a drive lever 31 pivotally mounted on the handle 10, and a snapping hook 32 having a first end mounted on the drive lever 31 to move therewith and a second end movably mounted in the slide slot 14 of the handle 10 and locked on the locking edge 22 of the blade 20 to lock the locking edge 22 of the blade 20 in the receiving recess 11 of the handle 10.

When a user wishes to replace the blade 20, the locking screw 40 is rotated by a hand tool, such as a screwdriver, so that the locking screw 40 is detached from the locking nut 50, thereby detaching the locking screw 40 from the locking hole 12 of the handle 10 and the through hole 21 of the blade 20. Then, the drive lever 31 of the locking member 30 is pivoted upward to move the snapping hook 32 toward the blade 20 to detach the locking edge 22 of the blade 20 from the snapping hook 32 of the locking member 30, thereby releasing the blade 20 from the locking member 30, so that the blade 20 can be detached from the handle 10 for replacement.

However, the user needs to use a hand tool to unscrew the locking screw 40 so as to detach the blade 20 from the handle 10 for replacement, so that the blade 20 cannot be detached from the handle 10 easily and rapidly, thereby causing inconvenience to the user in replacement of the blade 20.

SUMMARY OF THE INVENTION

In accordance with the present invention, there is provided a handsaw, comprising: a handle having an end provided with a support seat having an inside formed with a mounting recess having a mediate portion formed with a locking point; and a blade detachably mounted on the handle and having an end provided with an insertion section detachably inserted into the mounting recess of the support seat of the handle and having a lower portion formed with a locking recess detachably locked on the locking point of the support seat of the handle.

The primary objective of the present invention is to provide a handsaw having a replaceable blade that can be replaced easily and rapidly.

Another objective of the present invention is to provide a handsaw, wherein the user only needs to drive the drive lever of the locking member to detach the snapping hook of the locking member from the snapping groove of the handle so as to detach the blade from the handle, so that the blade is detached from the handle easily, rapidly and conveniently, thereby facilitating the user mounting and replacing the blade.

A further objective of the present invention is to provide a handsaw, wherein the insertion section of the blade has an upper portion rested on and limited by the mounting recess of the handle and a lower portion rested on and limited by the locking point of the handle, and the locking edge of the blade is locked by the snapping hook of the locking member, thereby forming a three-point positioning effect, so that the blade is fixed on the handle rigidly and stably.

A further objective of the present invention is to provide a handsaw, wherein the user only needs to drive the drive lever of the locking member to detach the blade from the handle, so that the blade is detached from the handle easily without aid of any hand tool, thereby facilitating the user replacing the blade.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–4, a handsaw in accordance with the preferred embodiment of the present invention comprises a handle 60 having an end provided with a support seat 61 having an inside formed with a mounting recess 62 having a mediate portion formed with a locking point 65 (see FIG. 4), and a blade 80 detachably mounted on the handle 60 and having an end provided with an insertion section 81 detachably inserted into the mounting recess 62 of the support seat 61 of the handle 60 and having a lower portion formed with a locking recess 82 detachably locked on the locking point 65 of the support seat 61 of the handle 60.

Figure 1:
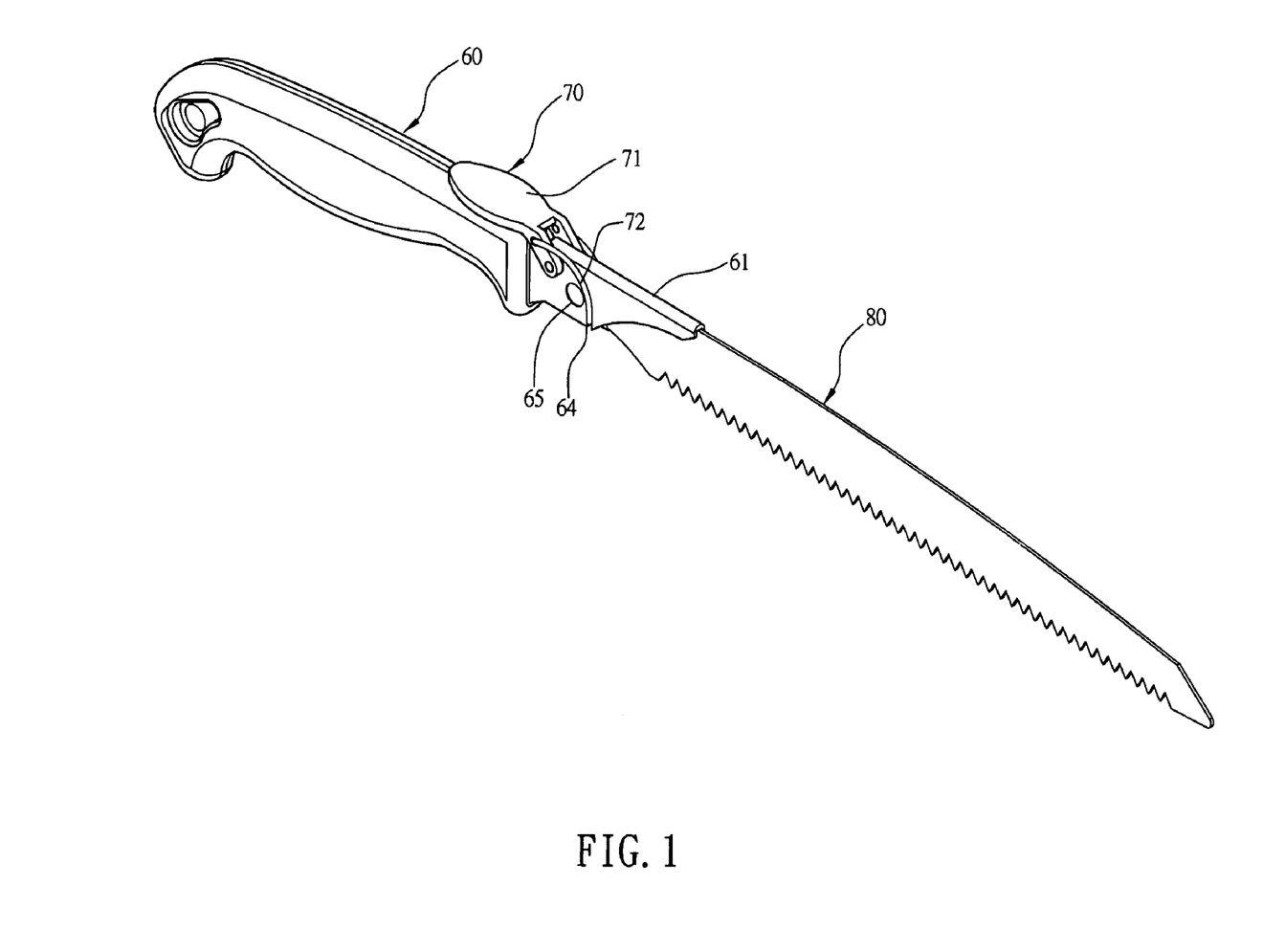
FIG. 1 is a perspective view of a handsaw in accordance with the preferred embodiment of the present invention.
Figure 2:
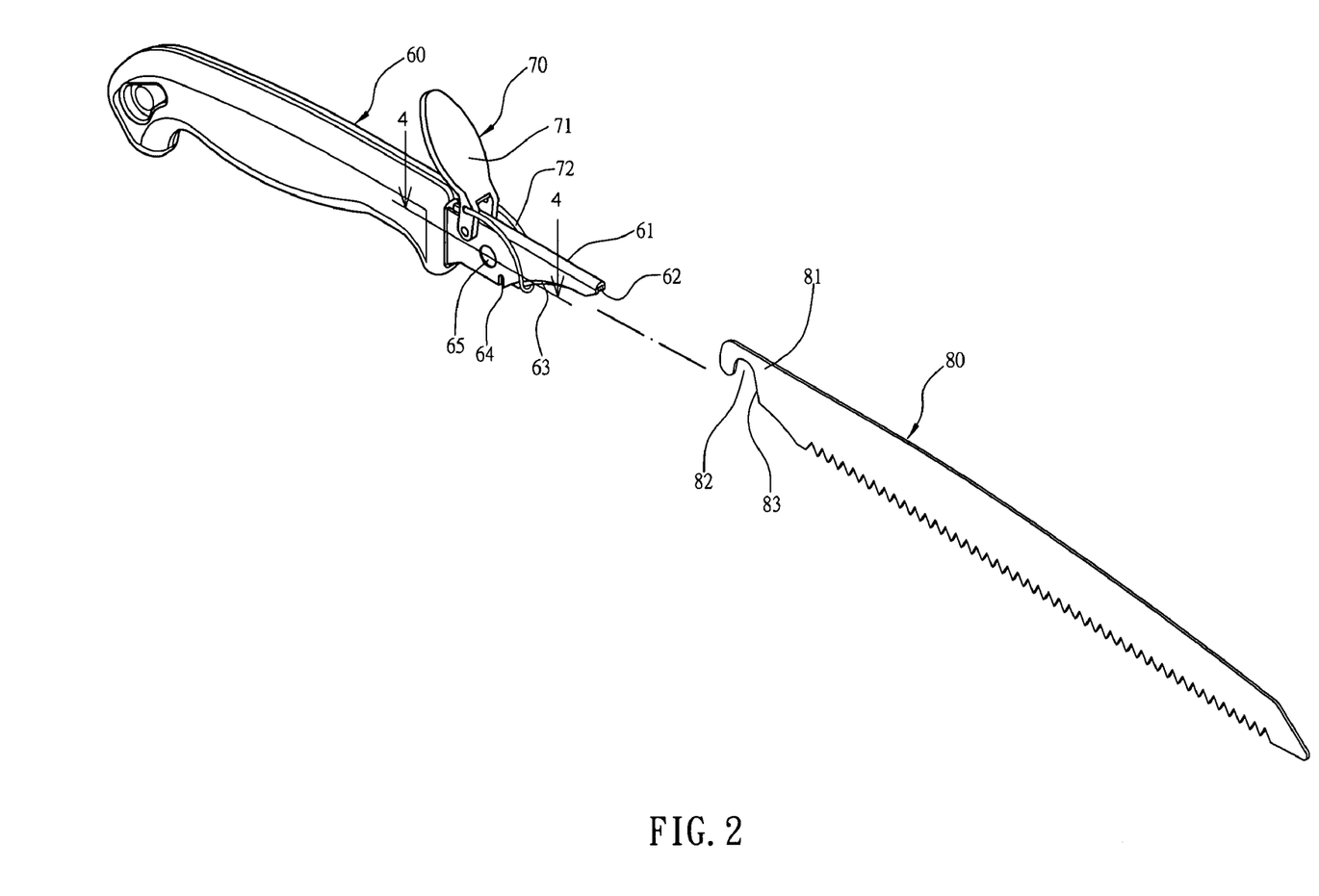
FIG. 2 is a partially exploded perspective view of the handsaw as shown in FIG. 1.
Figure 3:
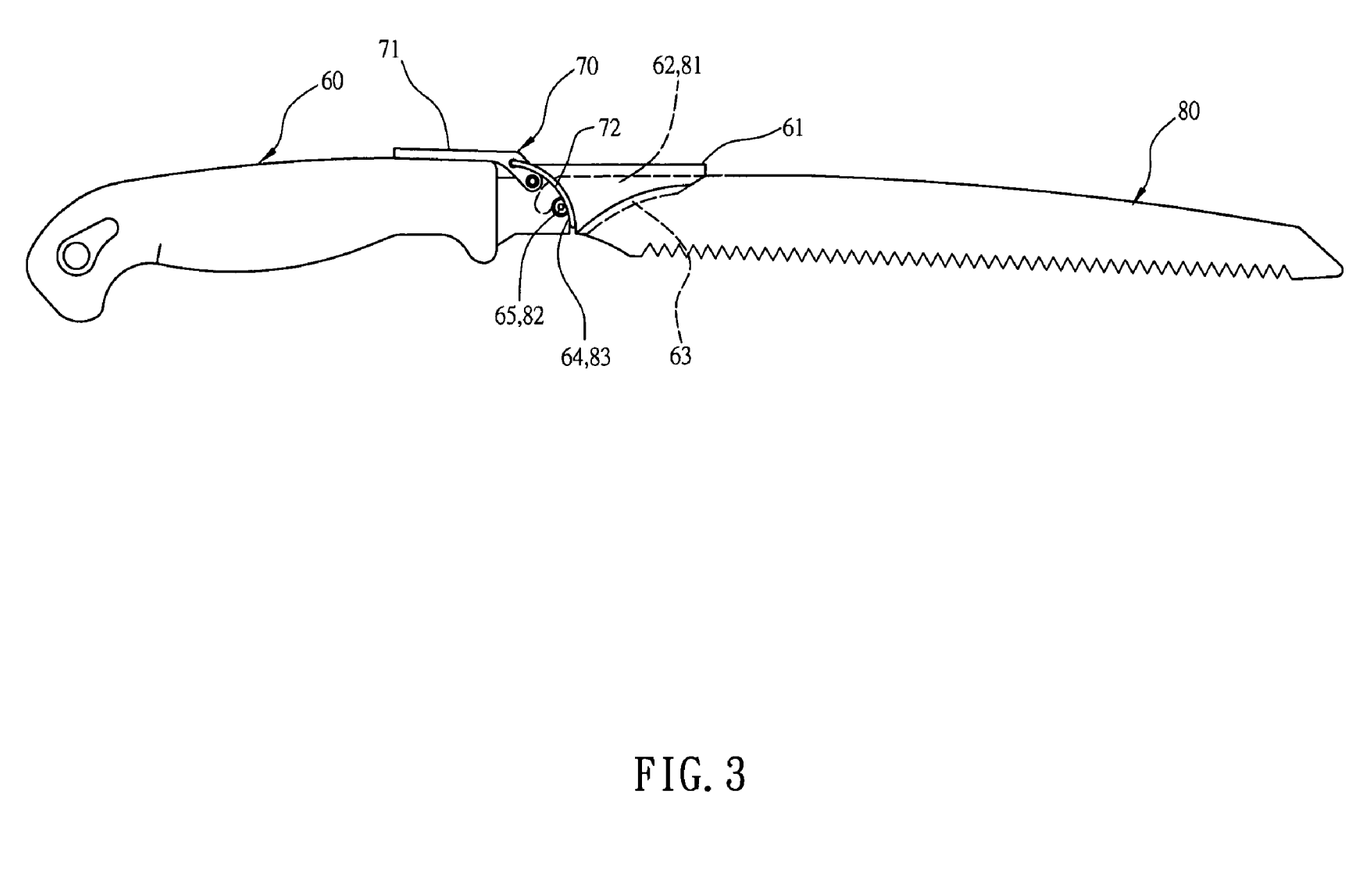
FIG. 3 is a plan view of the handsaw as shown in FIG. 1.
Figure 4:
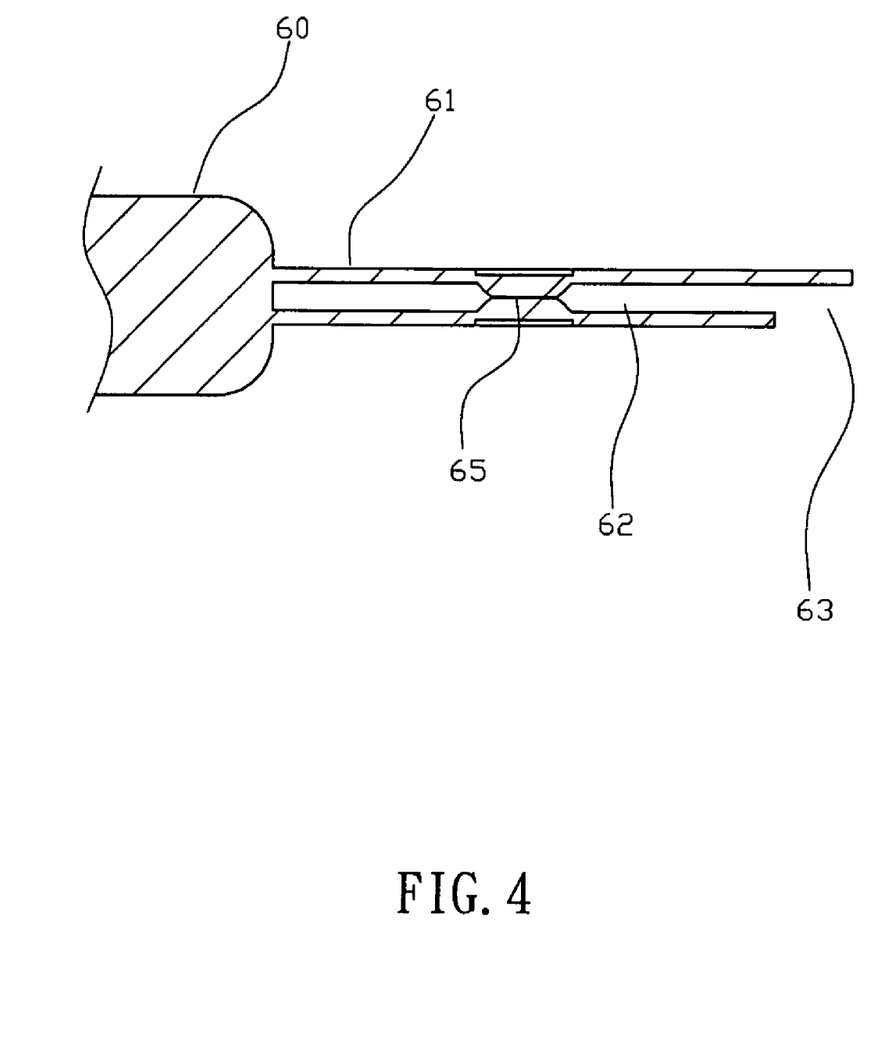
FIG. 4 is a plan cross-sectional view of the handsaw taken along line 4—4 as shown in FIG. 2.
Figure 5:
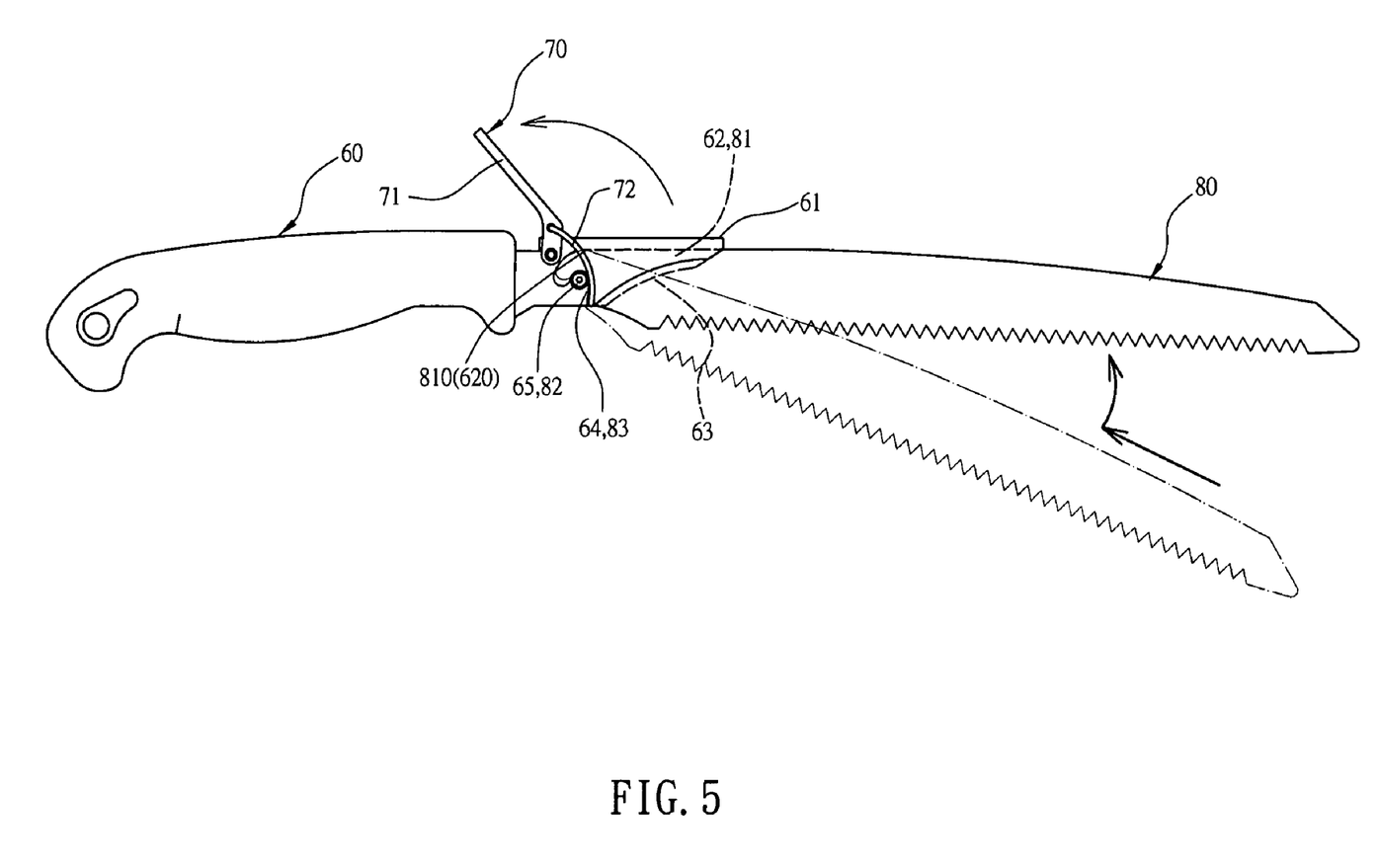
FIG. 5 is a schematic operational view of the handsaw as shown in FIG. 3.

The mounting recess 62 of the support seat 61 of the handle 60 has an opening directed forward and downward. The mounting recess 62 of the support seat 61 of the handle 60 has a substantially U-shaped structure and has a distal end formed with an entrance 63, and the insertion section 81 of the blade 80 is inserted into the entrance 63 of the mounting recess 62 of the support seat 61 of the handle 60 in an upward oblique manner as shown in FIG. 5. The entrance 63 of the mounting recess 62 of the support seat 61 of the handle 60 has an asymmetric shape and has two sides having different length (see FIG. 4) and thickness (see FIG. 3). The mediate portion of the mounting recess 62 of the support seat 61 of the handle 60 has a lower portion formed with a snapping groove 64 having a symmetric shape.

The locking recess 82 of the insertion section 81 of the blade 80 is substantially arc-shaped and has a side formed with an oblique locking edge 83.

A locking member 70 is mounted on the handle 60 and includes a drive lever 71 pivotally mounted on the support seat 61 of the handle 60, and a snapping hook 72 having a first end mounted on the drive lever 71 to move therewith and a second end movably mounted on the support seat 61 of the handle 60 and detachably snapped into the snapping groove 64 of the mounting recess 62 of the support seat 61 of the handle 60 to lock the locking edge 83 of the insertion section 81 of the blade 80 in the snapping groove 64 of the mounting recess 62 of the support seat 61 of the handle 60.

In assembly, referring to FIGS. 1–5, the insertion section 81 of the blade 80 is inserted into the entrance 63 of the mounting recess 62 of the support seat 61 of the handle 60 in an upward oblique manner as shown in FIG. 5, so that the locking point 65 of the support seat 61 of the handle 60 is snapped into the locking recess 82 of the insertion section 81 of the blade 80. After the insertion section 81 of the blade 80 is wholly inserted into the mounting recess 62 of the support seat 61 of the handle 60, the insertion section 81 of the blade 80 has an upper portion 810 rested on an upper portion 620 of the mounting recess 62 of the support seat 61 of the handle 60 and a lower portion rested on and limited by the locking point 65 of the support seat 61 of the handle 60. Then, the drive lever 71 of the locking member 70 is pivoted downward to move the snapping hook 72, so that the snapping hook 72 of the locking member 70 is snapped into the snapping groove 64 of the mounting recess 62 of the support seat 61 of the handle 60 to closely lock the locking edge 83 of the insertion section 81 of the blade 80 in the snapping groove 64 of the mounting recess 62 of the support seat 61 of the handle 60, thereby fixing the blade 80 on the handle 60.

In such a manner, the insertion section 81 of the blade 80 has an upper portion 810 rested on and limited by the mounting recess 62 of the handle 60 and a lower portion rested on and limited by the locking point 65 of the handle 60, and the locking edge 83 of the blade 80 is locked by the snapping hook 72 of the locking member 70, thereby forming a three-point positioning effect, so that the blade 80 is fixed on the handle 60 rigidly and stably.

Alternatively, when a user wishes to replace the blade 80, the drive lever 71 of the locking member 70 is pivoted upward to move the snapping hook 72, so that the snapping hook 72 of the locking member 70 is detached from the snapping groove 64 of the mounting recess 62 of the support seat 61 of the handle 60 to detach the locking edge 83 of the insertion section 81 of the blade 80 from the snapping groove 64 of the mounting recess 62 of the support seat 61 of the handle 60. Then, the blade 80 is pivoted downward through a determined angle, so that the insertion section 81 of the blade 80 is detached from the mounting recess 62 of the support seat 61 of the handle 60 in a downward oblique manner, thereby detaching the blade 80 from the handle 60.

Accordingly, the user only needs to drive the drive lever 71 of the locking member 70 to detach the snapping hook 72 of the locking member 70 from the snapping groove 64 of the handle 60 so as to detach the blade 80 from the handle 60, so that the blade 80 is detached from the handle 60 easily, rapidly and conveniently, thereby facilitating the user mounting and replacing the blade 80. In addition, the insertion section 81 of the blade 80 has an upper portion 810 rested on and limited by the mounting recess 62 of the handle 60 and a lower portion rested on and limited by the locking point 65 of the handle 60, and the locking edge 83 of the blade 80 is locked by the snapping hook 72 of the locking member 70, thereby forming a three-point positioning effect, so that the blade 80 is fixed on the handle 60 rigidly and stably. Further, the user only needs to drive the drive lever 71 of the locking member 70 to detach the blade 80 from the handle 60, so that the blade 80 is detached from the handle 60 easily without aid of any hand tool, thereby facilitating the user replacing the blade 80.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A handsaw, comprising:
    a handle having an end provided with a support seat having an inside formed with a mounting recess having a mediate portion formed with a locking point;
    a blade detachably mounted on the handle and having an end provided with an insertion section detachably inserted into the mounting recess of the support seat of the handle and having a lower portion formed with a locking recess detachably locked on the locking point of the support seat of the handle; wherein
    the mediate portion of the mounting recess of the support seat of the handle has a lower portion formed with a snapping groove, the locking recess of the insertion section of the blade has a side formed with an oblique locking edge, and the handsaw further comprises a locking member mounted on the handle and including a drive lever pivotally mounted on the support seat of the handle, and a snapping hook having a first end mounted on the drive lever to move therewith and a second end movably mounted on the support seat of the handle and detachably snapped into the snapping groove of the mounting recess of the support seat of the handle to lock the locking edge of the insertion section of the blade in the snapping groove of the mounting recess of the support seat of the handle.

2. The handsaw in accordance with claim 1, wherein the mounting recess of the support seat of the handle has an opening directed forward and downward.

3. The handsaw in accordance with claim 1, wherein the mounting recess of the support seat of the handle has a substantially U-shaped structure.

4. The handsaw in accordance with claim 1, wherein the mounting recess of the support seat of the handle has a distal end formed with an entrance.

5. The handsaw in accordance with claim 4, wherein the insertion section of the blade is inserted into the entrance of the mounting recess of the support seat of the handle in an upward oblique manner.

6. The handsaw in accordance with claim 4, wherein the entrance of the mounting recess of the support seat of the handle has an asymmetric shape.

7. The handsaw in accordance with claim 4, wherein the entrance of the mounting recess of the support seat of the handle has two sides having different length and thickness.

8. The handsaw in accordance with claim 1, wherein the locking recess of the insertion section of the blade is substantially arc-shaped.

9. The handsaw in accordance with claim 1, wherein the insertion section of the blade has an upper portion rested on and limited by the mounting recess of the handle and a lower portion rested on and limited by the locking point of the handle, and the locking edge of the blade is locked by the snapping hook of the locking member, thereby forming a three-point positioning effect.

10. The handsaw in accordance with claim 1, wherein the snapping groove of the mounting recess of the support seat of the handle has a symmetric shape.

11. The handsaw in accordance with claim 1, wherein the locking point of the support seat of the handle is snapped into the locking recess of the insertion section of the blade.

12. The handsaw in accordance with claim 1, wherein the insertion section of the blade has an upper portion rested on an upper portion of the mounting recess of the support seat of the handle and a lower portion rested on and limited by the locking point of the support seat of the handle.

* * * * *